US012650549B1

(12) United States Patent
Wu et al.

(10) Patent No.: US 12,650,549 B1
(45) Date of Patent: Jun. 9, 2026

(54) BACKLIGHT MODULE AND VEHICLE DISPLAY THEREOF

(71) Applicant: AmTRAN TECHNOLOGY CO., LTD, New Taipei City (TW)

(72) Inventors: Chih-Cheng Wu, New Taipei City (TW); Ruei-Chi Yuan, New Taipei City (TW); Ming-Chih Yu, New Taipei City (TW)

(73) Assignee: AmTRAN TECHNOLOGY CO., LTD, New Taipei City (TW)

( * ) Notice: Subject to any disclaimer, the term of this patent is extended or adjusted under 35 U.S.C. 154(b) by 0 days.

(21) Appl. No.: 19/212,736

(22) Filed: May 20, 2025

(30) Foreign Application Priority Data

Feb. 11, 2025 (TW) ................................. 114105018

(51) Int. Cl.
*F21V 8/00* (2006.01)
*B60K 35/22* (2024.01)

(52) U.S. Cl.
CPC ............ *G02B 6/0023* (2013.01); *B60K 35/22* (2024.01); *G02B 6/0021* (2013.01); *G02B 6/0091* (2013.01); *B60K 2360/336* (2024.01); *B60K 2360/349* (2024.01)

(58) Field of Classification Search
CPC .............. B60K 35/22; B60K 2360/336; B60K 2360/349; G02B 6/0021; G02B 6/0023; G02B 6/0081
See application file for complete search history.

(56) References Cited

U.S. PATENT DOCUMENTS

| | | | |
|---|---|---|---|
| 2007/0223248 A1 | 9/2007 | Han | |
| 2007/0279944 A1 | 12/2007 | Sakai | |
| 2008/0158477 A1* | 7/2008 | Hsiao | G02B 6/0031 |
| | | | 362/613 |
| 2012/0039090 A1 | 2/2012 | Jiang | |
| 2014/0146566 A1* | 5/2014 | Zheng | G02B 6/0025 |
| | | | 362/608 |
| 2014/0376265 A1 | 12/2014 | Na | |
| 2019/0018184 A1 | 1/2019 | Miyashita | |
| 2021/0080771 A1 | 3/2021 | Tezen | |
| 2021/0296534 A1 | 9/2021 | Kasai | |
| 2024/0246415 A1* | 7/2024 | Weller | B60K 35/28 |

FOREIGN PATENT DOCUMENTS

| | | | |
|---|---|---|---|
| CN | 101201149 A | 6/2008 | |
| CN | 102788293 A | 11/2012 | |
| EP | 1 881 267 A1 | 1/2008 | |
| JP | 2004241237 A | * | 8/2004 |
| TW | 201037410 A1 | 10/2010 | |

* cited by examiner

*Primary Examiner* — Keith G. Delahoussaye
(74) *Attorney, Agent, or Firm* — Winston Hsu

(57) ABSTRACT

A backlight module is applied to a vehicle display and includes a substrate, a light guide and a light-transmitting buffer. The substrate has at least one light emitting element. A supporting portion is disposed on a corner of the light guide. The light-transmitting buffer is disposed inside a gap between the substrate and the supporting portion and configured to cover the light emitting element, so as to prevent the supporting portion from impacting the substrate.

8 Claims, 9 Drawing Sheets

1

BACKLIGHT MODULE AND VEHICLE DISPLAY THEREOF

BACKGROUND OF THE INVENTION

1. Field of the Invention

The present invention relates to a backlight module and a vehicle display, and more particularly, to a backlight module and a vehicle display without abnormal noise and corner shadows.

2. Description of the Prior Art

A conventional automotive backlight module installs the buffer element on each corner of the inner side of the back plate, and attaches the light guide to the back plate; the compressible characteristic of the buffer element provides structural interference to clamp and fix the light guide in the back plate. However, the ambient temperature around the automotive backlight module is increased after long-term use, and the sizes of the buffer element and the light guide are reduced due to the material property. If the sum of size reduction of the buffer element and the light guide exceeds the interference amount of initial design, the gap is generated between the buffer element and the light guide, and the column foot of the light guide is likely to collide with the back plate and produces abnormal noise when the automotive backlight module is shaken or vibrated. In addition, the light guide needs to have the column base of sufficient width to prevent the column base from being broken due to collision with the back plate. However, if the size of the column base becomes larger, the placement space of the light-emitting unit inside the automotive backlight module is decreased. The corner of the light guide where on the column foot is located is away from the light-emitting unit, and the image presented by the vehicle backlight module has the shadowing phenomenon at the position corresponding to the column foot. Therefore, design of a backlight module and a vehicle display that can prevent the abnormal noise and the corner shadow is an important issue in the related mechanical design industry.

SUMMARY OF THE INVENTION

The present invention provides a backlight module and a vehicle display, which are capable of preventing abnormal noise and corner shadows, so as to solve aforementioned drawbacks.

According to the claimed invention, a backlight module includes a substrate, a light guide and a light-transmitting buffer. The substrate has at least one light emitting element. A supporting portion is disposed on a corner of the light guide. The light-transmitting buffer is disposed inside a gap between the substrate and the supporting portion and adapted to cover the light emitting element, thereby blocking the supporting portion from directly hitting the substrate.

According to the claimed invention, a vehicle display includes a case and a backlight module. The case includes a rear frame and a front frame assembled with each other. The backlight module is located between the rear frame and the front frame. The backlight module includes a substrate, a light guide and a light-transmitting buffer. The substrate is disposed on a lateral wall of the rear frame, and the substrate has at least one light emitting element. A supporting portion is disposed on a corner of the light guide. The light-transmitting buffer is disposed inside a gap between the substrate and the supporting portion, and covers the light emitting element, so as to prevent the supporting portion from directly hitting the substrate.

The backlight module and the vehicle display of the present disclosure feature the light-transmitting buffer that is attached to the specific light emitting element of the light bar and positioned adjacent to the supporting portion located at the corner of the light guide. When the vehicle equipped with the vehicle display travels over rough road, the buffer characteristics of the light-transmitting buffer can effectively absorb the vibration of the light guide, so as to prevent collisions with the substrate that may generate abnormal noise. Furthermore, when the backlight module is exposed to high temperature environment that cause material shrinkage, the buffer characteristics of the light-transmitting buffer can also prevent or reduce the impact force of the light guide against the substrate, so as to eliminate the abnormal noise, and correspondingly prevent the supporting portion of the light guide from breaking due to excessive impact.

Moreover, it is preferable to maintain a gap of at least 0.3 mm between the light-transmitting buffer and the bottom of the opening structure of the light guide, so as to prevent the light-transmitting buffer from directly contacting the light guide. this air gap can also enhance the refractive index difference, thereby making the light emitted by the light emitting element to be more widely diffused. Since positioning the backlight module closer to the light guide can improve the dark-corner prevention effect of the backlight module, the light-transmitting buffer and the light guide may optionally adhered together using an optical adhesive. Furthermore, the light-transmitting buffer and the optical element can be integrally formed using over-molding injection technology with two different materials. To enhance bonding strength, a concave or a protruding structure may be provided on the adjacent surfaces between the light-transmitting buffer and the optical element to increase the contact area between them.

In the present disclosure, the backlight module is configured with the opening structure next to the supporting portion of the light guide (which means the light guide is not the conventional straight or flat design), thereby providing sufficient space to accommodate the light-transmitting buffer and the optical element. The optical element can be the secondary lens having the directional light guiding effect. The light-transmitting buffer not only prevents the supporting portion of the light guide colliding with the substrate and generating the abnormal noise, but also serves to secure the optical element on the specific light emitting element of the light bar, for expanding the illumination range of the illumination beam emitted by the light emitting element; e.g., increasing the illumination angle from 60° to 150°. Therefore, the backlight module and the vehicle display of the present disclosure can effectively prevent the abnormal noise, avoid the structure breakage due to collision, and eliminate shadowing phenomena at the corners of the light guide.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
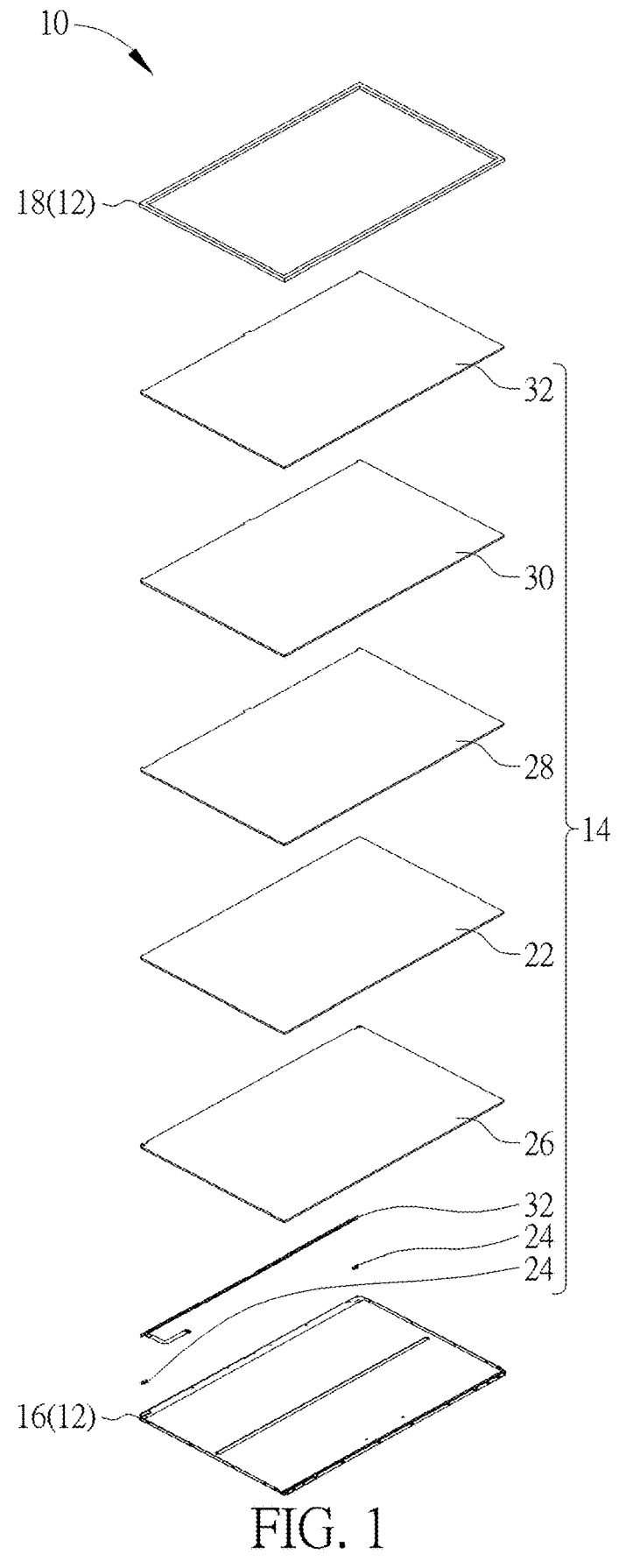
FIG. 1 is an exploded diagram of a vehicle display according to an embodiment of the present disclosure.
Figure 2:
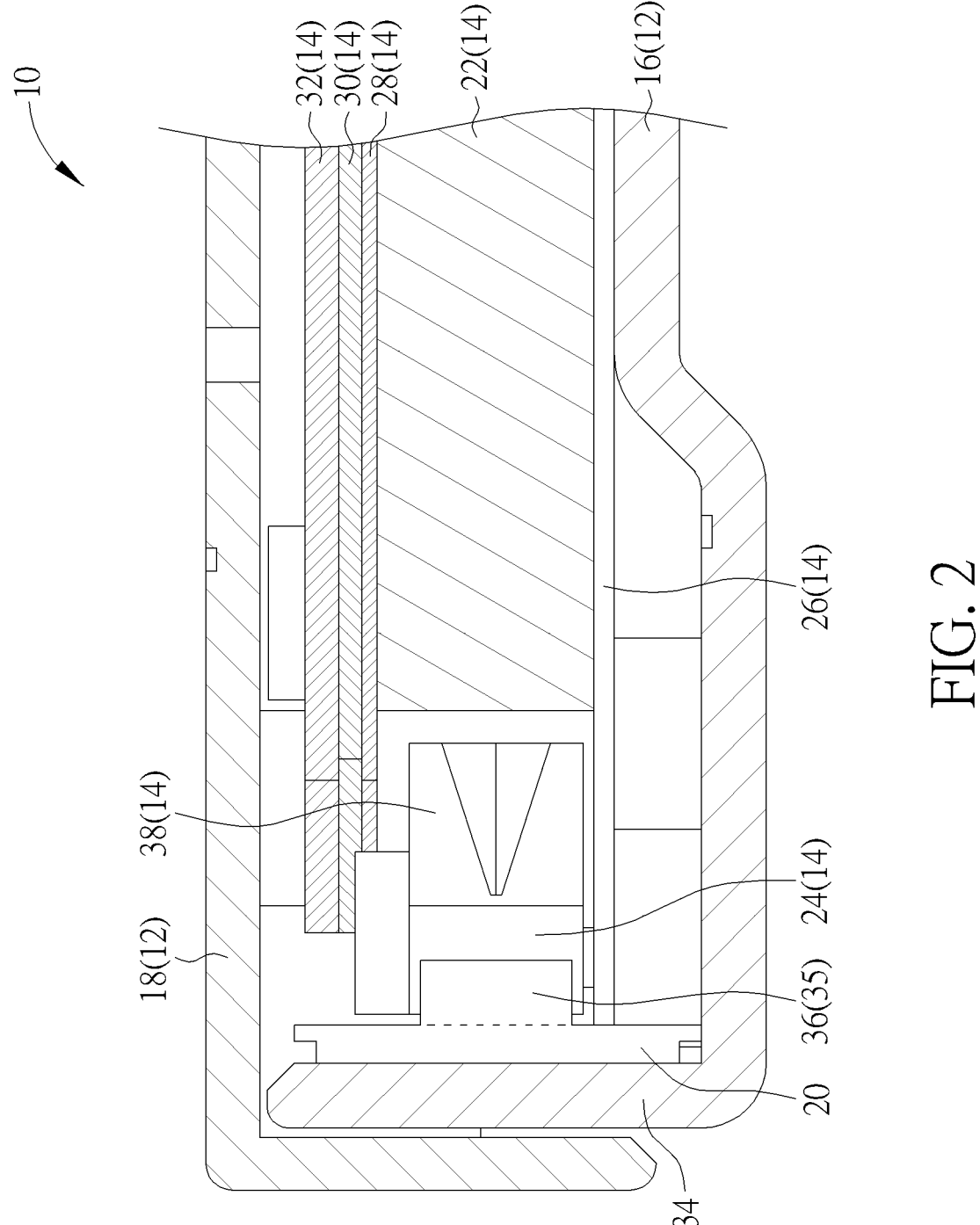
FIG. 2 is a structurally sectional view of parts of the vehicle display according to the embodiment of the present disclosure.

Please refer to FIG. 1 and FIG. 2. FIG. 1 is an exploded diagram of a vehicle display 10 according to an embodiment of the present disclosure. FIG. 2 is a structurally sectional view of parts of the vehicle display 10 according to the embodiment of the present disclosure. The vehicle display 10 can include a case 12 and a backlight module 14. The case 12 can have a rear frame 16 and a front frame 18 assembled together. The backlight module 14 can be disposed between the rear frame 16 and the front frame 18, and optionally include a substrate 20, a light guide 22, a light-transmitting buffer 24, a reflection member 26, a diffusion member 28, a brightness enhancement member 30, a polarized brightness enhancement member 32 and an optical element 38. In the present disclosure, the substrate 20 can be disposed on a lateral wall 34 of the rear frame 16, and a light bar 35 which has one or several light emitting elements 36 can be installed on the substrate 20. The substrate 20 can be a circuit board and configured to provide electricity to the light emitting element 36 of the light bar 35. The number of the light-transmitting buffer 24 and the optical element 38 is not limited to the illustrated embodiment, and may vary depending on design requirements.

The assembly sequence of the present disclosure is as follows: positioning the light bar 35 on the lateral wall 34 of the rear frame 16 via the substrate 20, and installing the light-transmitting buffer 24 and the optical element 38; then, installing the reflection member 26, the light guide 22, the diffusion member 28, the brightness enhancement member 30, the polarized brightness enhancement member 32 and the front frame 18 in order, so as to complete the assembly of the vehicle display 10. However, the actual assembly sequence is not limited to the embodiment described above, and may vary depending on the inclusion or exclusion of the optical members (such as the reflection member 26, the diffusion member 28, the brightness enhancement member 30 and/or the polarized brightness enhancement member 32). Besides, the optical members can have common optical reflection, refraction, diffusion and polarization functions, and a detailed description is omitted herein for simplicity.

Figure 3:
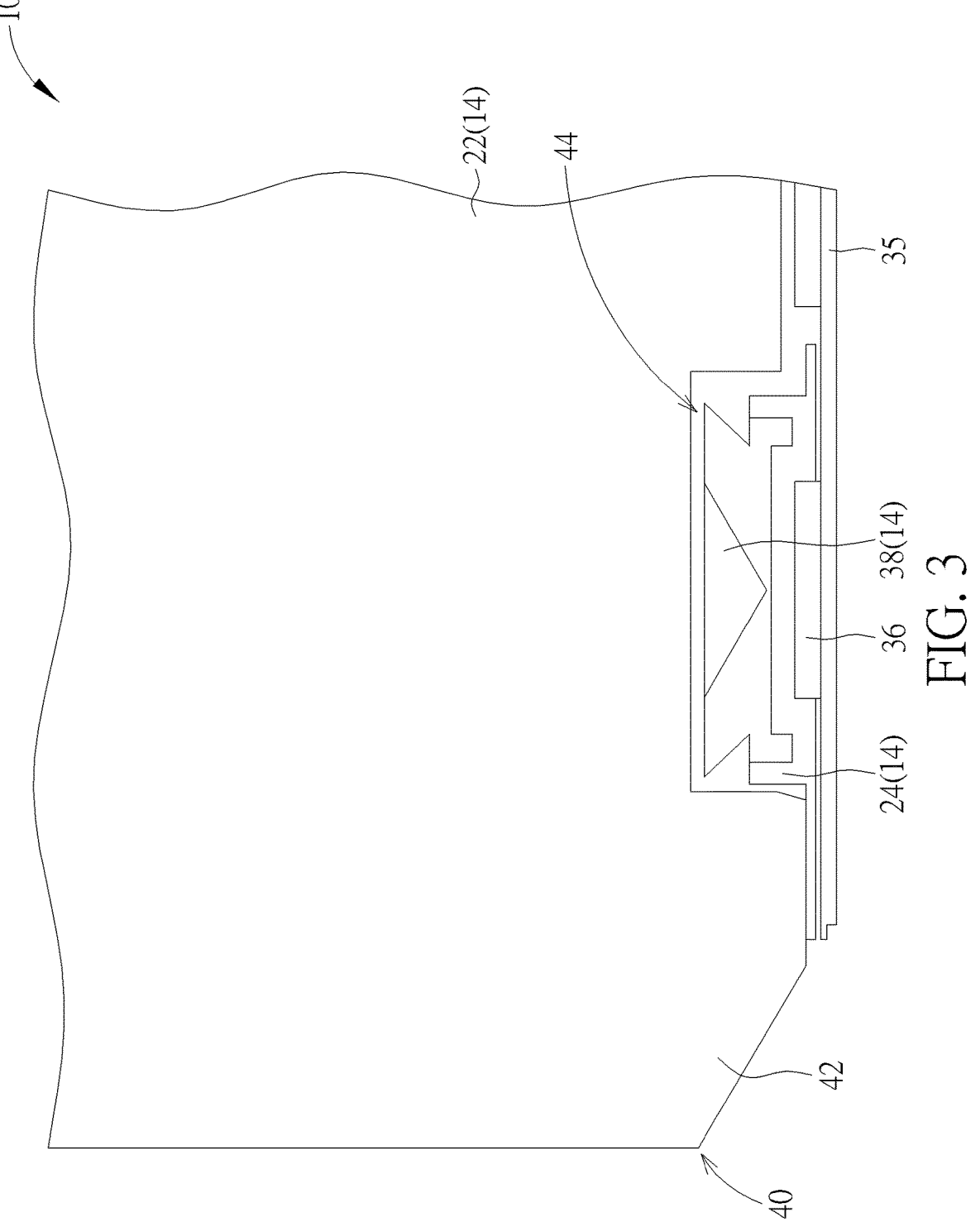
FIG. 3 is a structurally top view of parts of the vehicle display according to the embodiment of the present disclosure.
Figure 4:
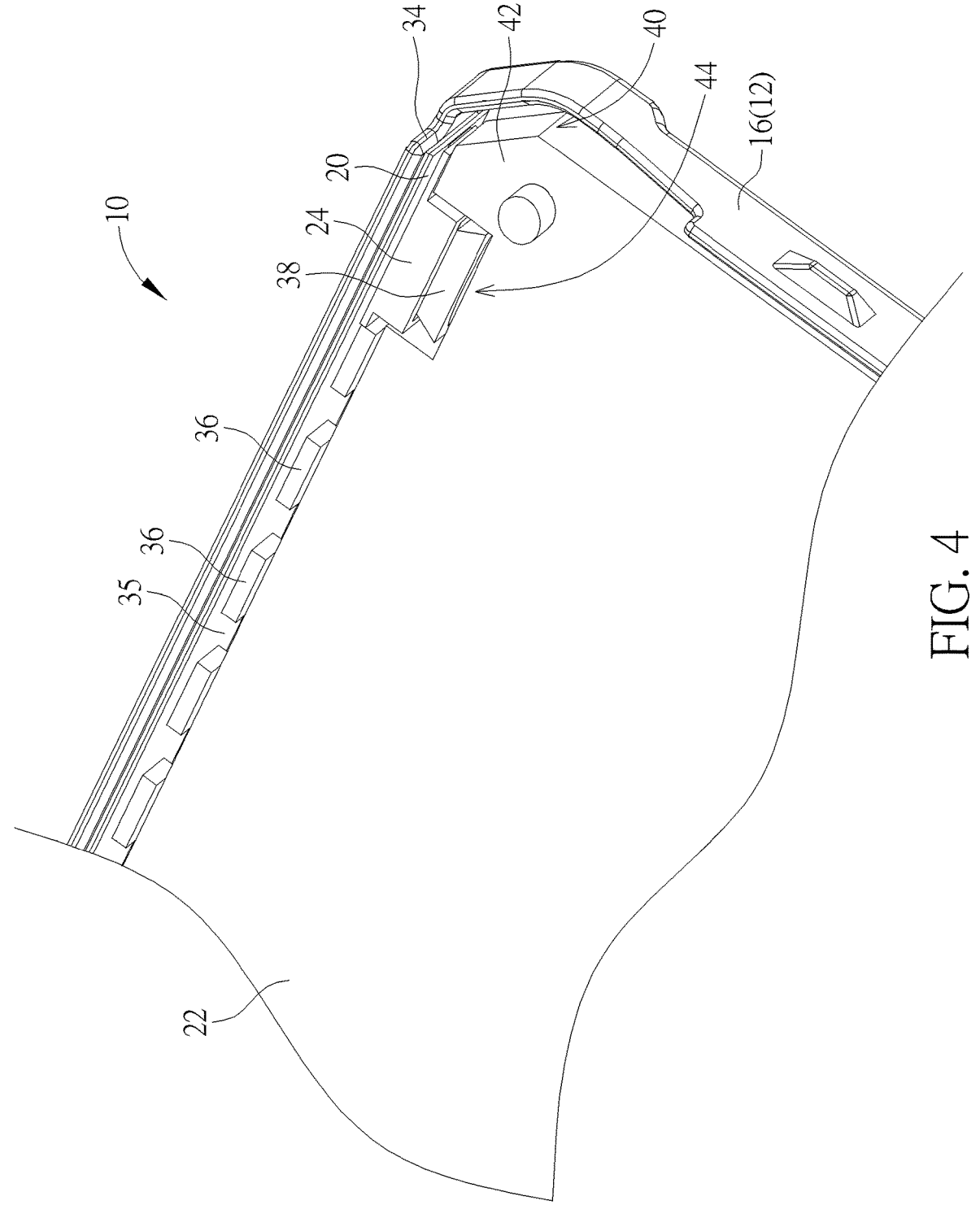
FIG. 4 and FIG. 5 are assembly diagrams of parts of the vehicle display in different views according to the embodiment of the present disclosure.
Figure 5:
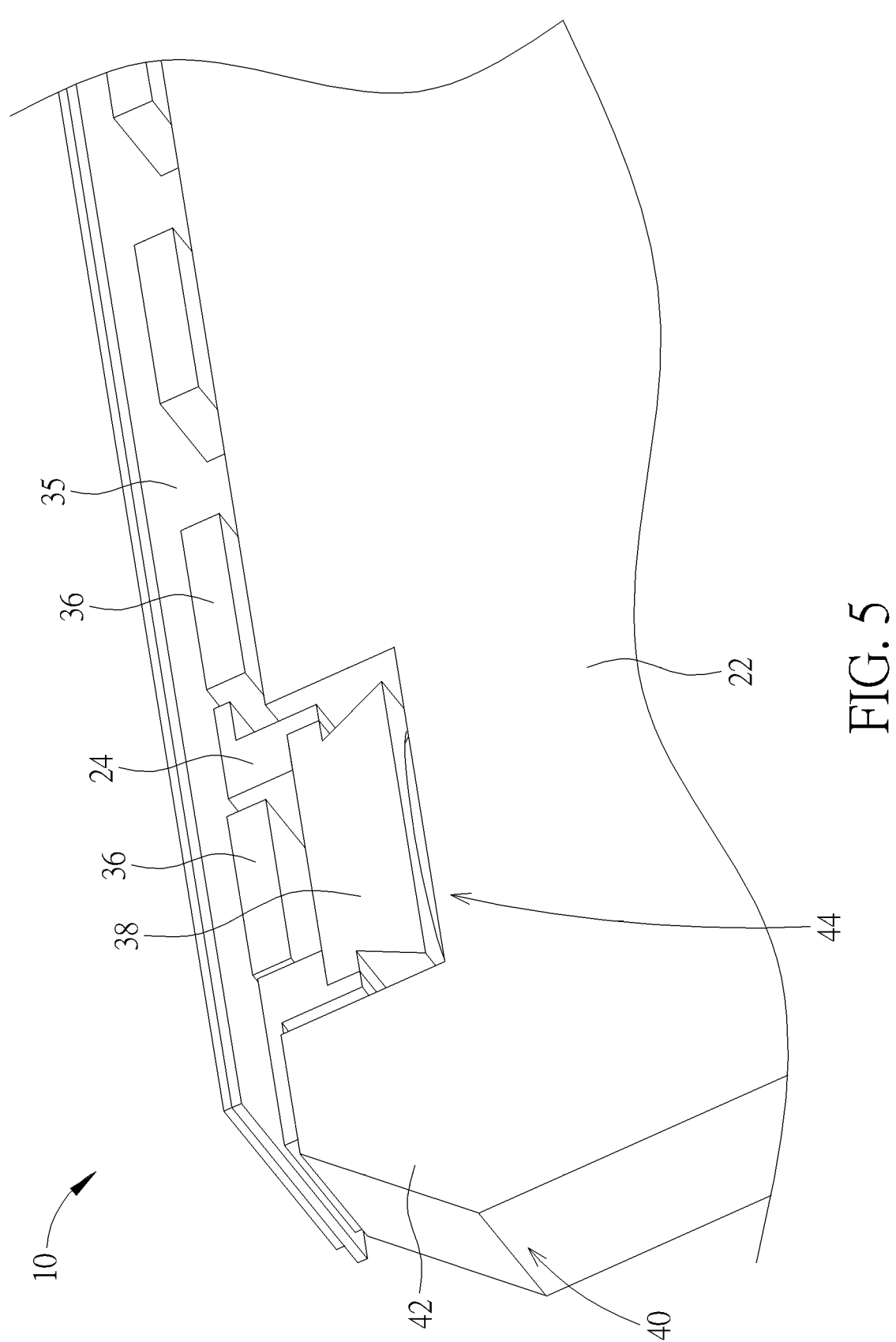
Figure 6:
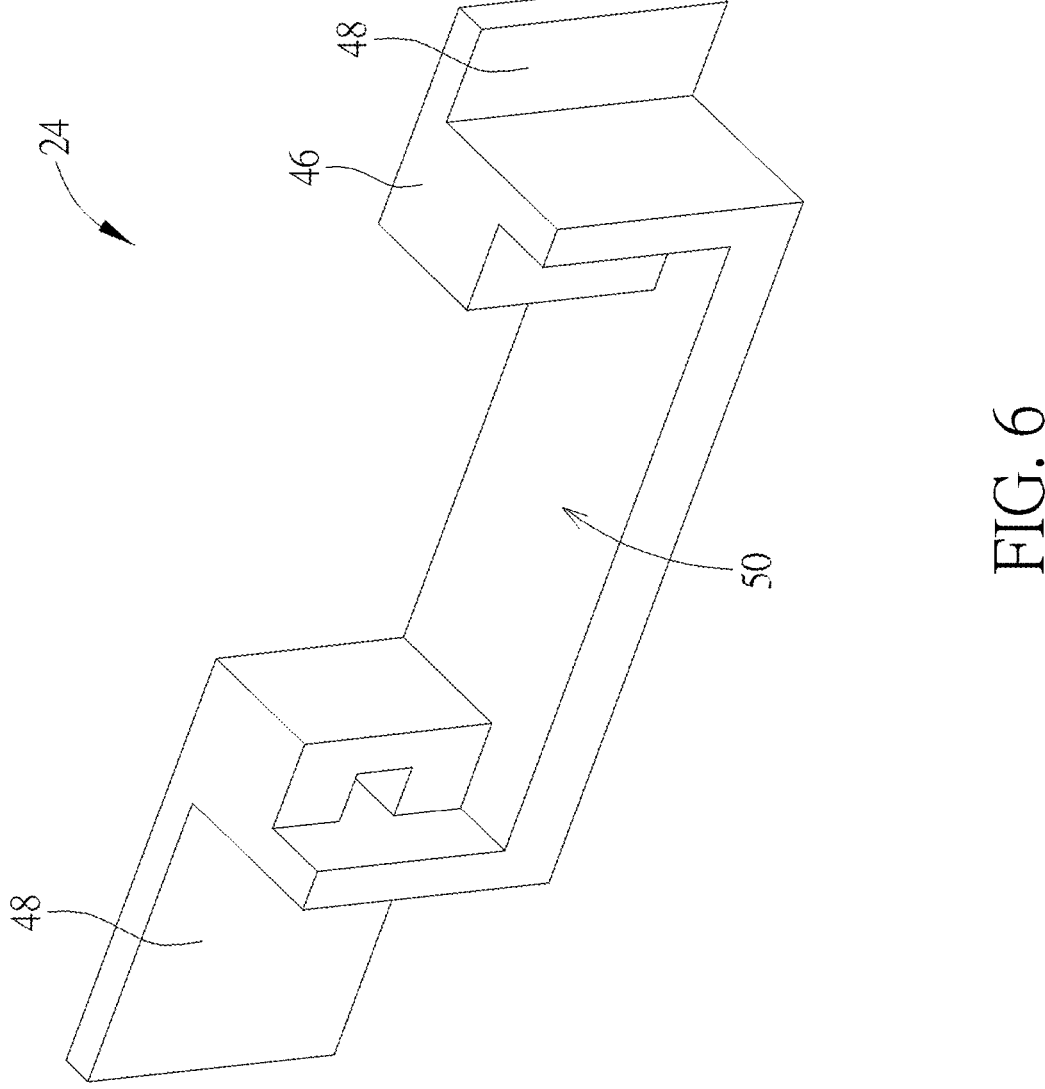
FIG. 6 is an appearance diagram of a light-transmitting buffer according to the embodiment of the present disclosure.
Figure 7:
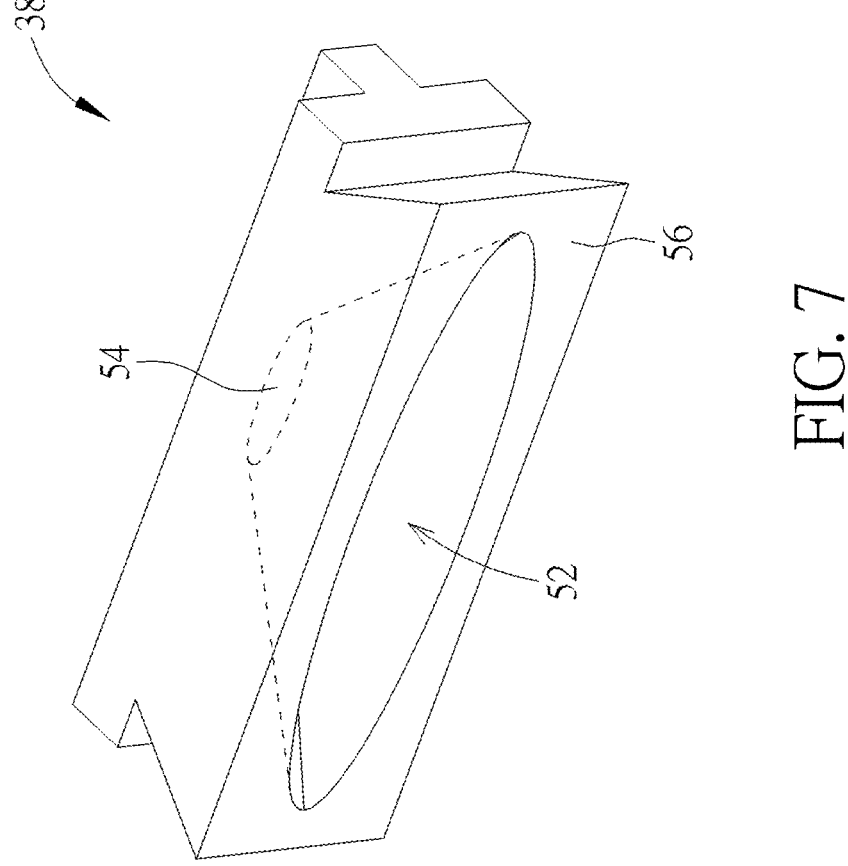
FIG. 7 is an appearance diagram of an optical element according to the embodiment of the present disclosure.

Please refer to FIG. 3 to FIG. 7. FIG. 3 is a structurally top view of parts of the vehicle display 10 according to the embodiment of the present disclosure. FIG. 4 and FIG. 5 are assembly diagrams of parts of the vehicle display 10 in different views according to the embodiment of the present disclosure. FIG. 6 is an appearance diagram of the light-transmitting buffer 24 according to the embodiment of the present disclosure. FIG. 7 is an appearance diagram of the optical element 38 according to the embodiment of the present disclosure. A supporting portion 42 can be formed on a corner 40 of the light guide 22, and an opening structure 44 can be formed on place adjacent to the supporting portion 42. The opening structure 44 can align with the light emitting element 36 located on an edge or any position of the light bar 35. The size of the opening structure 44 can be preferably greater than or equal to the size of the light-transmitting buffer 24.

The light-transmitting buffer 24 can be made by a material that is both light-permeable and compressible. The light-transmitting buffer 24 can be disposed in the gap between the substrate 20 and the supporting portion 42, and covers the light emitting element 36. The optical element 38 described in the present disclosure can be an optional element. If the backlight module 14 does not include the optical element 38 disposed on the light-transmitting buffer 24 (this embodiment is not shown in the figures), the structural height of the light-transmitting buffer 24 is preferably greater than or equal to a distance from the bottom of the opening structure 44 to the light bar 35 or the light emitting element 36 That is, the light-transmitting buffer 24 can support the light guide 22 to prevent the supporting portion 42 from contacting the light bar 35 of the substrate 20. If the optical element 38 is disposed on the light-transmitting buffer 24, the combined structural height of assembly of the light-transmitting buffer 24 and the optical element 38 is preferably greater than or equal to the distance from the bottom of the opening structure 44 to the light bar 35 or the light emitting element 36. This configuration blocks the supporting portion 42, preventing it from directly impacting the substrate 20 or the light bar 35 mounted thereon.

The light-transmitting buffer 24 may at least include a main body 46, an extension portion 48 and a through hole structure 50. One or more outer surfaces of the main body 46 may optionally be provided with a light scattering structure depend on the design requirements. The extension portion 48 is disposed on opposite sides of the main body 46, and extends into the gap between the substrate 20 and the supporting portion 42. The through hole structure 50 is disposed in the middle of the main body 46 and aligned with the light emitting element 36. The optical element 38 can be a directional light-guiding lens or an optical film, and is disposed between the light-transmitting buffer 24 and the light guide 22, for expanding an illumination range of light emitted by the light emitting element 36. One end of the optical element 38, which face the light-transmitting buffer 24, includes a recessed portion 52. The recessed portion 52 is preferably formed as an oval-shaped tapered hole, as illustrated in the embodiment shown in FIG. 7. Alternatively, it may be formed as a conical hole, a triangular pyramid hole or a concave lens, although these variations are not illustrated in the figures, any optical structure capable of expanding the illumination range is considered within the design scope of the recessed portion 52 of the optical element 38 as disclosed herein.

In the present disclosure, the recessed portion 52 of the optical element 38 can be formed as the oval tapered hole. The inclination angle of the minor axis of the oval tapered hole is preferably between 15 degrees and 30 degrees, and the inclination angle of the major axis of the oval tapered hole is preferably set between 20 degrees and 60 degrees. However, the actual disclosure is not limited those values. In addition, the bottom 54 of the oval tapered hole may optionally be formed as a plane surface, (such as the embodiment shown in FIG. 7) or a conical structure (not illustrated). A textured or arbitrary microstructures may be formed on the bottom 54 to enhance the uniformity of light passing through it. Similarly, the top 56 of the oval tapered hole may also be provided with a textured or arbitrary microstructure.

Figure 8:
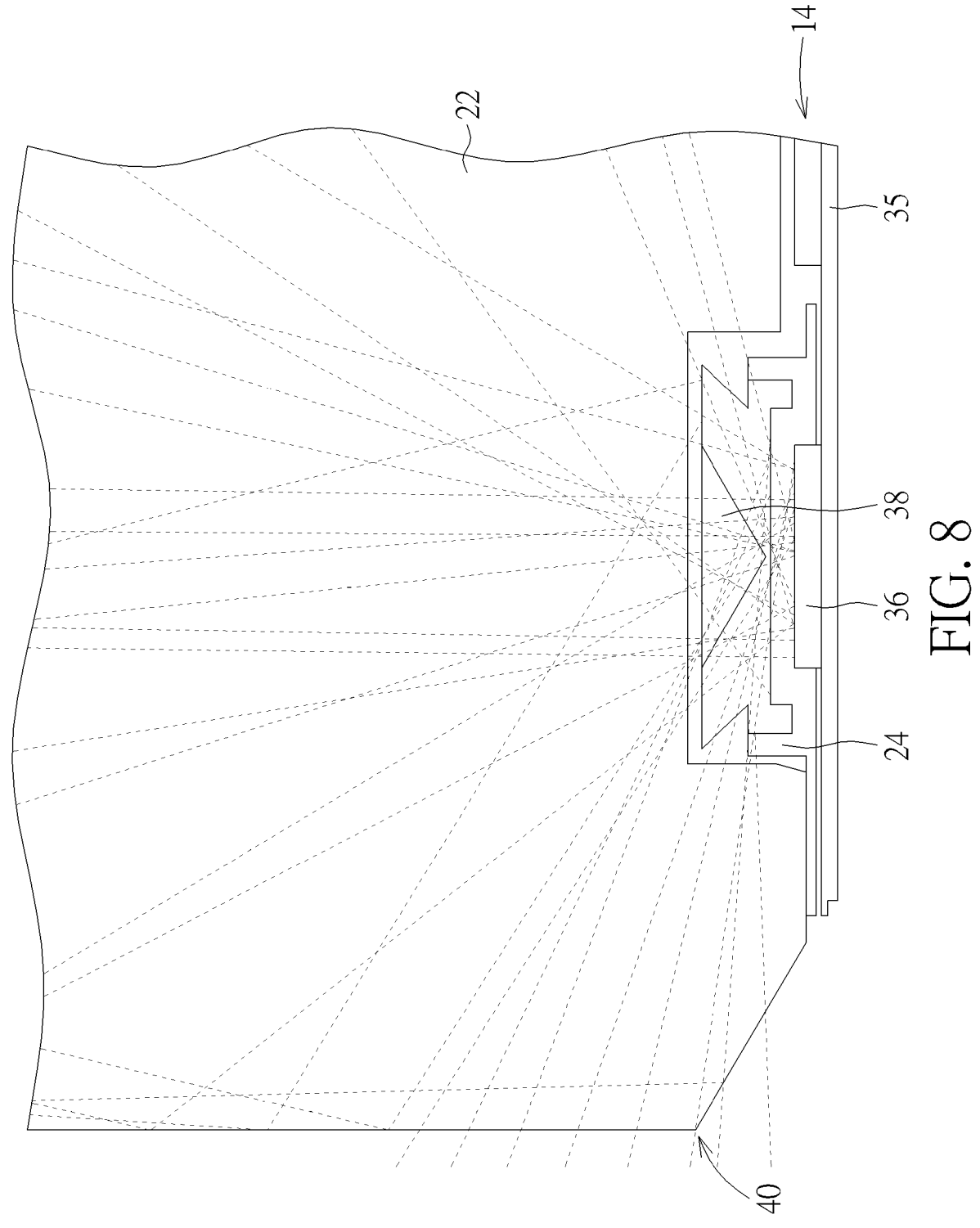
FIG. 8 is a diagram of an optical path of a backlight module according to the embodiment of the present disclosure.
Figure 9:
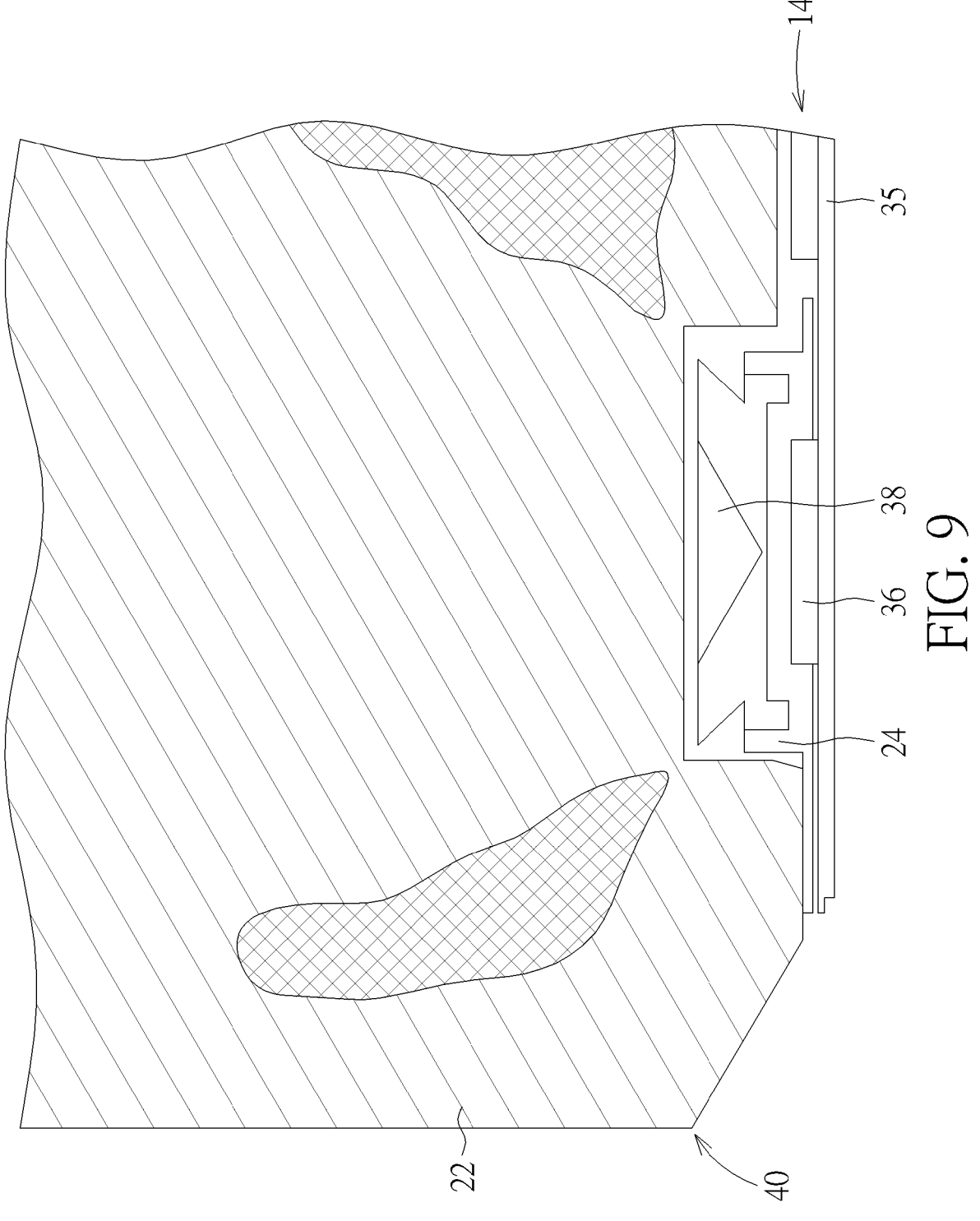
FIG. 9 is a diagram of an optical simulation result of the backlight module according to the embodiment of the present disclosure.

Please refer to FIG. 8 and FIG. 9. FIG. 8 is a diagram of an optical path of the backlight module 14 according to the embodiment of the present disclosure. FIG. 9 is a diagram of an optical simulation result of the backlight module 14 according to the embodiment of the present disclosure. In this present disclosure, the light-transmitting buffer 24 and the optical element 38 are disposed to cover the light emitting element 36 located at the outermost edge of the light bar 35. By leveraging the refractive index difference between air and the light guide 22, the light-transmitting buffer 24 and the optical element 38, light emitted by the light emitting element 36 can be more broadly diffused, as shown in FIG. 8. Therefore, the corner 40 of the light guide 22 can maintain sufficient brightness. As illustrated in FIG. 9, a checkerboard area presents lower brightness, while a diagonal-patterned area demonstrates higher brightness. It is evident that no dark appears at the corner 40.

In conclusion, the backlight module 14 and the vehicle display 10 of the present disclosure feature the light-transmitting buffer 24 attached to the specific light emitting element 36 of the light bar 35 and positioned adjacent to the supporting portion 42 located at the corner 40 of the light guide 22. When the vehicle equipped with the vehicle display 10 travels over rough road, the buffer characteristics of the light-transmitting buffer 24 can effectively absorb vibrations of the light guide 22, so as to prevent collisions with the substrate 20 that may generate abnormal noise. Furthermore, when the backlight module 14 is exposed to high temperature environments that cause material shrinkage, the buffer characteristics of the light-transmitting buffer 24 can also prevent or reduce the impact force of the light guide 22 against the substrate 20, so as to eliminate the abnormal noise and prevent the supporting portion 42 of the light guide 22 from breaking due to excessive impact.

Moreover, it is preferable to maintain the gap of at least 0.3 mm is preferably maintained between the light-transmitting buffer 24 and the bottom of the opening structure 44 of the light guide 22, so as to prevent direct contact between the light-transmitting buffer 24 and the light guide 22. The air gap between them can also increase the refractive index difference, so as to make the light emitted by the light emitting element 36 to be more effectively diffused. Since positioning the backlight module 14 closer to the light guide 22 can improve the dark-corner prevention effect of the backlight module 14, the light-transmitting buffer 24 and the light guide 22 may optionally adhered together using an optical adhesive. Furthermore, the light-transmitting buffer 24 and the optical element 38 can be integrally formed using over-molding injection technology with two different materials. To enhance bonding strength, a concave or a protruding structure may be provided on the adjacent surfaces between the light-transmitting buffer 24 and the optical element 38 (as shown in FIG. 6 and FIG. 7) to increase the contact area between them.

In the present disclosure, the backlight module 14 is configured with the opening structure 44 next to the supporting portion 42 of the light guide 22 (which means the light guide is not the conventional straight or flat design), thereby providing sufficient space to accommodate the light-transmitting buffer 24 and the optical element 38. The optical element 38 can be the secondary lens having the directional light guiding effect. The light-transmitting buffer 24 not only prevents the supporting portion 42 of the light guide 22 from colliding with the substrate 20 and generating the abnormal noise, but also serves to secure the optical element 38 on the specific light emitting element 36 of the light bar 35, for expanding the illumination range of the illumination beam emitted by the light emitting element 36; e.g., increasing the illumination angle from 60° to 150°. Therefore, the backlight module 14 and the vehicle display 10 of the present disclosure can effectively prevent the abnormal noise, avoid the structure breakage due to collision, and eliminate shadowing phenomena at the corners of the light guide 22.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight module comprising:
a substrate having at least one light emitting element;
a light guide, a supporting portion being disposed on a corner of the light guide; and
a light-transmitting buffer disposed inside a gap between the substrate and the supporting portion and configured to cover the light emitting element, so as to prevent the supporting portion from directly impacting the substrate;
wherein the light guide comprises an opening structure located adjacent to the supporting portion and aligned with the light emitting element, wherein a size of the opening structure is greater than or equal to a size of the light-transmitting buffer.

2. The backlight module of claim 1, wherein the light-transmitting buffer comprises a main body, an extension portion and a through hole structure, the extension portion is disposed on a side of the main body to extend into the gap, and the through hole structure is disposed in the middle of the main body and aligns with the light emitting element.

3. The backlight module of claim 2, wherein a light scattering structure is formed on an outer surface of the main body.

4. The backlight module of claim 1, further comprising:
an optical element disposed between the light-transmitting buffer and the light guide, and configured to expand an illumination range of light emitted by the light emitting element.

5. A vehicle display comprising:
a case, comprising a rear frame and a front frame assembled with each other; and
a backlight module located between the rear frame and the front frame, the backlight module comprising:
a substrate disposed on a lateral wall of the rear frame, the substrate having at least one light emitting element;
a light guide, a supporting portion being formed on a corner of the light guide; and
a light-transmitting buffer disposed inside a gap between the substrate and the supporting portion and configured to cover the light emitting element, so as to prevent the supporting portion from directly impacting the substrate;
wherein the light guide comprises an opening structure located adjacent to the supporting portion and aligned with the light emitting element, wherein a size of the opening structure is greater than or equal to a size of the light-transmitting buffer.

6. The vehicle display of claim 5, wherein the light-transmitting buffer comprises a main body, an extension portion and a through hole structure, the extension portion is disposed on a side of the main body to extend into the gap, the through hole structure is disposed in the middle of the main body and aligns with the light emitting element, and a light scattering structure is formed on an outer surface of the main body.

7. The vehicle display of claim 5, wherein the backlight module further comprises an optical element disposed between the light-transmitting buffer and the light guide, and configured to expand an illumination range of light emitted by the light emitting element.

8. The vehicle display of claim 5, wherein the backlight module further comprises:

a reflection member disposed between the light guide and the rear frame;

a diffusion member disposed between the light guide and the front frame; and a brightness enhancement member disposed between the diffusion member and the front frame.

* * * * *